United States Patent
Adachi

(12) United States Patent (10) Patent No.: US 6,408,216 B1
(45) Date of Patent: Jun. 18, 2002

(54) POSITION CONTROL APPARATUS USING SERVOMOTOR

(75) Inventor: Mitsuaki Adachi, Aichi (JP)

(73) Assignee: Okuma Corporation, Aichi (JP)

(*) Notice: Subject to any disclaimer, the term of this patent is extended or adjusted under 35 U.S.C. 154(b) by 0 days.

(21) Appl. No.: 09/312,723

(22) Filed: May 17, 1999

(30) Foreign Application Priority Data

Jun. 4, 1998 (JP) .......................................... 10-156475

(51) Int. Cl.$^7$ .............................................. G05B 19/18
(52) U.S. Cl. .................... 700/63; 318/560; 318/592; 700/56
(58) Field of Search ................. 318/560, 652, 318/599, 602, 605, 592, 696; 700/56, 63

(56) References Cited

U.S. PATENT DOCUMENTS

| | | | | |
|---|---|---|---|---|
| 4,016,472 A | * | 4/1977 | Leenhouts | 318/696 |
| 4,496,891 A | * | 1/1985 | Kobayashi | 318/696 |
| 4,684,865 A | * | 8/1987 | Auger | 318/696 |
| 5,194,793 A | * | 3/1993 | Niimi | 318/568.15 |
| 6,016,044 A | * | 1/2000 | Holdaway | 318/696 |
| 6,211,642 B1 | * | 4/2001 | Holdaway | 318/696 |

* cited by examiner

*Primary Examiner*—Thomas Black
*Assistant Examiner*—Ronald D Hartman, Jr.
(74) *Attorney, Agent, or Firm*—Oliff & Berridge, PLC

(57) ABSTRACT

The present invention provides a position control apparatus in which a motor output torque can be approximated to that of the maximum output torque curve of the motor by generating a position command combining constant acceleration and exponential acceleration. This position control apparatus comprises means for generating a position command so as to give constant acceleration by adding an acceleration unit quantity $\Delta Naa$, set as a parameter beforehand, to a speed unit quantity $N(n)$, means for generating a position command by calculating an acceleration unit quantity using an exponential function expression and by adding the calculated result to the speed unit quantity $N(n)$, and means for generating a position command by comparing the present speed unit quantity $N(n)$ and a function change speed unit quantity $Nc$ set as a parameter beforehand and by selecting either of the command generating means described above on the basis of the compared result.

2 Claims, 8 Drawing Sheets

POSITION CONTROL APPARATUS USING SERVOMOTOR

BACKGROUND OF THE INVENTION

1. Field of the Invention

The present invention relates to a position control apparatus to be controlled using a servomotor, and more particularly, to a position control apparatus which can minimize a positioning time by optimizing an accelerating command for the position control apparatus.

2. Description of the Related Art

FIG. 5 is a block diagram showing an example of conventional position control apparatus. This position control apparatus comprises a numerical control divider 10, a servo control divider 20, a motor 30, and a position detector 40. In the numerical control divider 10, the program interpreter 12 generates a desired value data MD according to the content of the program input to part program storage section 11. A function generating section 15a calculates a speed unit quantity N (n) on the basis of the maximum speed unit quantity Nmax set as a parameter into the maximum speed storage section 13, the accelerating unit quantity ΔNa and the decelerating unit quantity ΔNb set as parameters into the acceleration storage section 14, and the desired value data MD, and then outputs the calculated N (n) to the servo control divider 20. The servo control divider 20 generates a position command CON by integrating the output speed unit quantity N (n) with respect to time by means of an integrator 21. Next, a position and speed control section 22 generates a torque command MT on the basis of the position command CON and the detected position APA detected by a position detector 40, and supplies the torque command MT to the motor 30 via an inverter 23 to drive the motor 30. In this case, because the position detector 40 is connected to the motor 30 by means of a coupling, the motor 30 is controlled by a position feedback control through feeding back the detected position APA detected thereby to the position and speed control section 22.

FIG. 6 is a flow chart showing the operation of the function generating section 15a shown in FIG. 5. A program interpreter 12 generates the desired value data MD according to the content of the program input to the part program storage section 11, and supplies the desired value data MD to the function generating section 15a.

The function generating section 15a calculates the difference between the position command CON of the desired value data MD and the detected position APA to obtain a residual distance DR (S1).

Next, the difference between the residual distance DR and a deceleratable distance DD is calculated, and then mode discrimination is carried out to discriminate whether a speed unit quantity N (n+1) at the next step should be set to an accelerating mode or a decelerating mode according to the polarity of the calculated difference. In other words, if DR>DD, then the discrimination shows an accelerating mode. On the contrary, if DR≦DD, then the discrimination shows a decelerating mode. In this case, the deceleratable distance DD is calculated by executing an integral computation on the basis of the present speed unit quantity N (n) and the decelerating unit quantity ΔNb set as a parameter beforehand, to determine the decelerating time (S2).

When an accelerating mode has been discriminated at S2, the difference between the present speed unit quantity N (n) and the maximum speed unit quantity Nmax set as a parameter into the maximum speed storage section 13 is calculated. Then, the mode discrimination is executed to discriminate whether the speed unit quantity N (n+1) at the next step should be set to an accelerating mode or a constant speed mode according to the polarity of the calculated difference (S3).

When an accelerating mode has been discriminated at S3, N' (n+1) is calculated by adding the accelerating unit quantity ΔNa, set as a parameter into the acceleration storage section 14, to the present speed unit quantity N (n) (S4a).

Next, the difference between the N' (n+1) calculated at S4a and the maximum speed unit quantity Nmax set as a parameter into the maximum speed storage section 13 is calculated. Then, the polarity of the calculated difference is discriminated (S5).

When the result of the calculation at S5 is larger than zero, that is, N' (n+1)−Nmax>0, the speed unit quantity N (n+1) at the next step is decided as N (n+1)=Nmax (S6).

When the result of the calculation at S5 is smaller than or equal to zero, that is, N' (n+1)−Nmax≦0, the speed unit quantity N (n+1) at the next step is decided as N (n+1)=N' (n+1) (S7).

On the other hand, when a constant speed mode has been discriminated at S3, because the present speed unit quantity N (n) is equal to Nmax, the speed unit quantity at the next step is decided as N (n+1)=Nmax (S8).

When a decelerating mode has been discriminated at S2, the speed unit quantity N (n+1) at the next step is calculated by subtracting the decelerating unit quantity ΔNb, set as a parameter into the acceleration storage section 14, from the present speed unit quantity N (n) (S9).

The upper figure of FIG. 7 shows a change of the speed unit quantity N (n) and a waveform of a motor speed when a desired position has been given. In this waveform of a motor speed, trz shows an accelerating period, tfz a decelerating period, and tz a positioning period necessary for arriving at the desired position. The speed unit quantity N (n) used as a position command is generated in the function generating section 15a for every calculation period T.

A period from (1) to (2) shows a period for an accelerating mode. During this period, a position command is generated by adding the accelerating unit quantity ΔNa, set as a parameter into the acceleration storage section 14, to the present speed unit quantity N (n). Therefore, the waveform of the motor speed shows constant acceleration having a positive inclination. Time t3 shows the end of the accelerating period where the N (n) is equal to Nmax.

A period (3) shows a period for a constant speed mode. During this period, a position command is equal to the maximum speed unit quantity Nmax.

A period from (4) to (5) shows a period for a decelerating mode. During this period, a position command is generated by subtracting the decelerating unit quantity ΔNb, set as a parameter into the acceleration storage section 14, from the present speed unit quantity N (n). Therefore, the waveform of the motor speed shows constant acceleration having a negative inclination.

The lower figure of FIG. 7 shows a waveform of motor torque. In this figure, Tq1 is accelerating torque during the period from (1) to (2), Td frictional torque during the period (3), and Ts decelerating torque during the period from (4) to (5).

FIG. 8 is a diagram showing an output torque characteristic of a motor. The maximum output torque of the motor varies with a change of the motor speed as follows:

In the range where (0≦motor speed<Nc), the maximum output torque shows a constant value of Tqmax (constant torque region). This is caused by the fact that the electric current to be supplied to motor 30 is restricted by the servo control divider 20.

In the range where (Nc≦motor speed<Nmax), the maximum output torque shows a curve connecting a point [Nc, Tqmax] and a point [Nmax, Tq1] in a coordinate system of [motor speed, motor torque]. Relationships between the coordinates of these two points are (Nc<Nmax) and (Tqmax>Tq1). In other words, the motor torque decreases with increase of the motor speed (power supply saturation region).

This is caused by the fact that an induced voltage in a motor increases in proportion to the motor speed, and the voltage difference between the induced voltage and the DC voltage supplied to the inverter 23 decreases, and consequently the motor current decreases below the lower limit in the servo control divider 20.

A position command in the accelerating mode is represented by constant acceleration having a positive inclination, and is written as $$N(t) = (N\max/trz) \cdot t. \tag{Eq. 1}$$

In this case, it is necessary to determine an accelerating period trz so that the output torque is lower than the maximum output torque curve illustrated with a thick line in FIG. 8. Consequently, the accelerating period trz is written in terms of ωmax, which is the maximum speed unit quantity Nmax reduced to angular velocity, and Tq1 which is a minimum value of the maximum output torque curve in the range from 0 to Nmax, as $$trz = J \cdot \omega \max / (Tq1 - Td), \tag{Eq. 2}$$

where J is the total sum of the motor inertia and the load inertia to be coupled to the motor, and Td is the frictional torque.

When the waveforms of the motor speed and the motor torque shown in FIG. 7 are overwritten on the output torque characteristic curve of the motor shown in FIG. 8, arrows (1), (2), (3), (4), and (5) are obtained.

In the prior art described above, a position command in the accelerating mode is generated by adding the accelerating unit quantity ΔNa, set as a parameter, to the present speed unit quantity N (n) so that constant acceleration can be obtained. Therefore, the accelerating period must be such that the output torque is decided by the minimum value of the maximum output torque curve in the output torque characteristic curve of the motor, that is Tq1, at the maximum speed unit quantity Nmax. Consequently, there is such a problem that the accelerating period is comparatively longer.

An object of the present invention is to solve the above problem and to provide an position control apparatus which can shorten a positioning time by reducing the accelerating period through generating a position command so that a motor torque coincides with the maximum output torque curve of the motor.

SUMMARY OF THE INVENTION

The present invention provides a position control apparatus in which a position command is generated on the basis of a desired value data, a speed unit quantity, and an accelerating unit quantity so that output torque of a servomotor is smaller than the maximum output torque of the servomotor, and the servomotor is driven by the torque command calculated on the basis of the position command, the position control apparatus comprising: means for generating a first position command so as to give constant acceleration by adding the accelerating unit quantity ΔNaa, set as a parameter beforehand, to the speed unit quantity N (n); means for generating a second position command by calculating the accelerating unit quantity using an exponential function expression and by adding the calculated result to the speed unit quantity N (n); and means for generating a position command by comparing the present speed unit quantity N (n) and the function change speed unit quantity Nc set as a parameter beforehand and by selecting either of the position command generating means described above on the basis of the compared result.

According to the present invention, two types of position commands such as a constant acceleration type and an exponential function acceleration type can be generated in accordance with the maximum output torque curve of the output torque characteristics of a motor, and an optimum command between these position commands can be selected. Consequently, it is easily realized to shorten the accelerating period and the positioning time.

DESCRIPTION OF PREFERRED EMBODIMENTS

Figure 1:
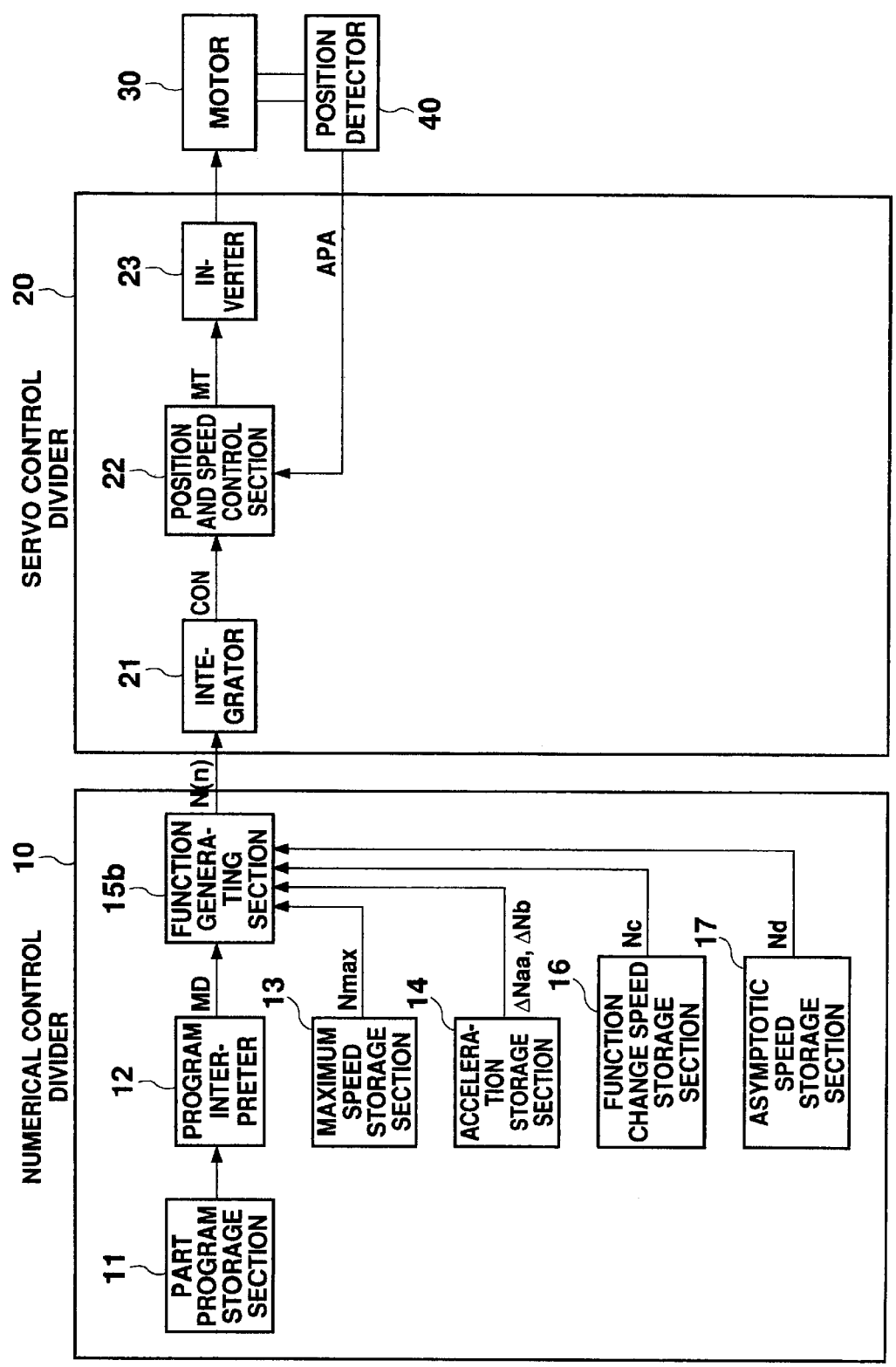
FIG. 1 is a block diagram of a position control apparatus according to an embodiment of the present invention.

FIG. 1 is a block diagram of a position control apparatus according to an embodiment of the present invention. The same components as those of an example of the prior art described above are designated with the same reference numerals, and explanations for these components are omitted here.

In a position control apparatus according to the present embodiment, function generating section 15*b* calculates a speed unit quantity N (n) on the basis of the maximum speed unit quantity Nmax set as a parameter into a maximum speed storage section 13, the accelerating unit quantity ΔNaa and the decelerating unit quantity ΔNb set as parameters into an acceleration storage section 14, the function change speed unit quantity Nc set as a parameter into a function change speed storage section 16, the asymptotic speed unit quantity Nd set as a parameter into an asymptotic speed storage section 17, and the desired value data MD. Then, the calculated speed unit quantity N (n) is output to the servo control divider 20.

Figure 2:
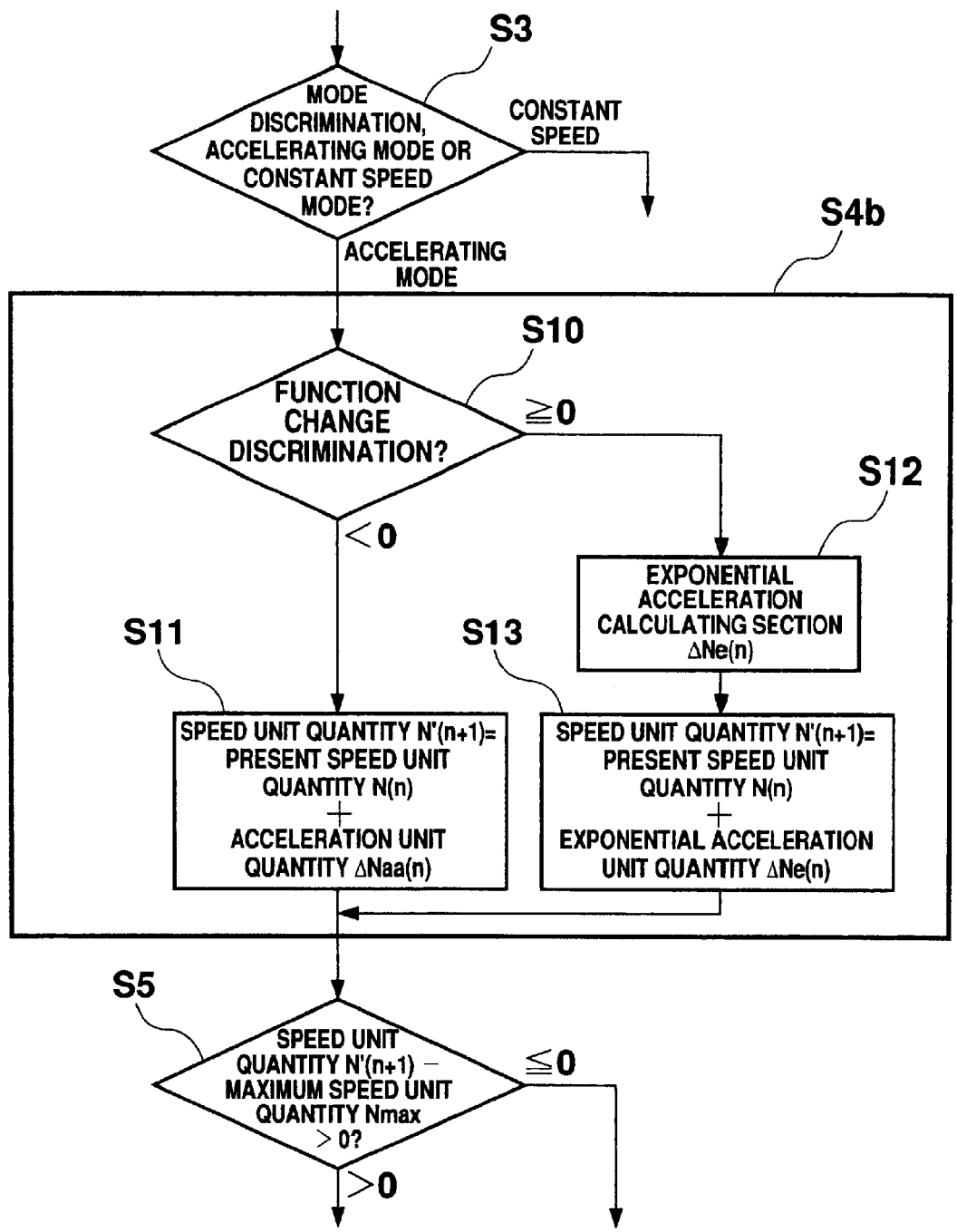
FIG. 2 is a part of a flow chart showing operation of a function generating section shown in FIG. 1.
Figure 6:
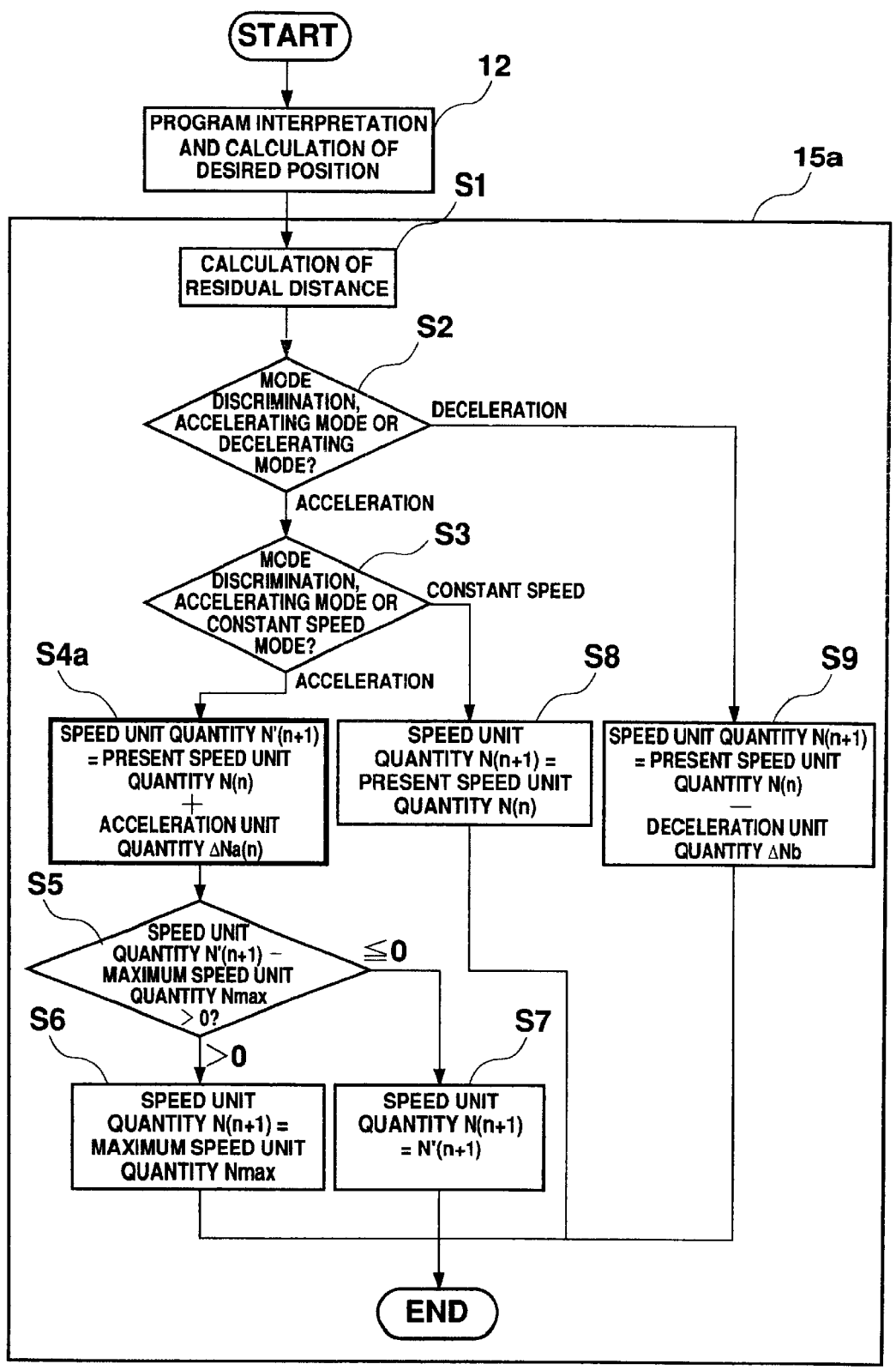
FIG. 6 is a flow chart showing operation of function generating section 15*a* shown in FIG. 5.
Figure 7:
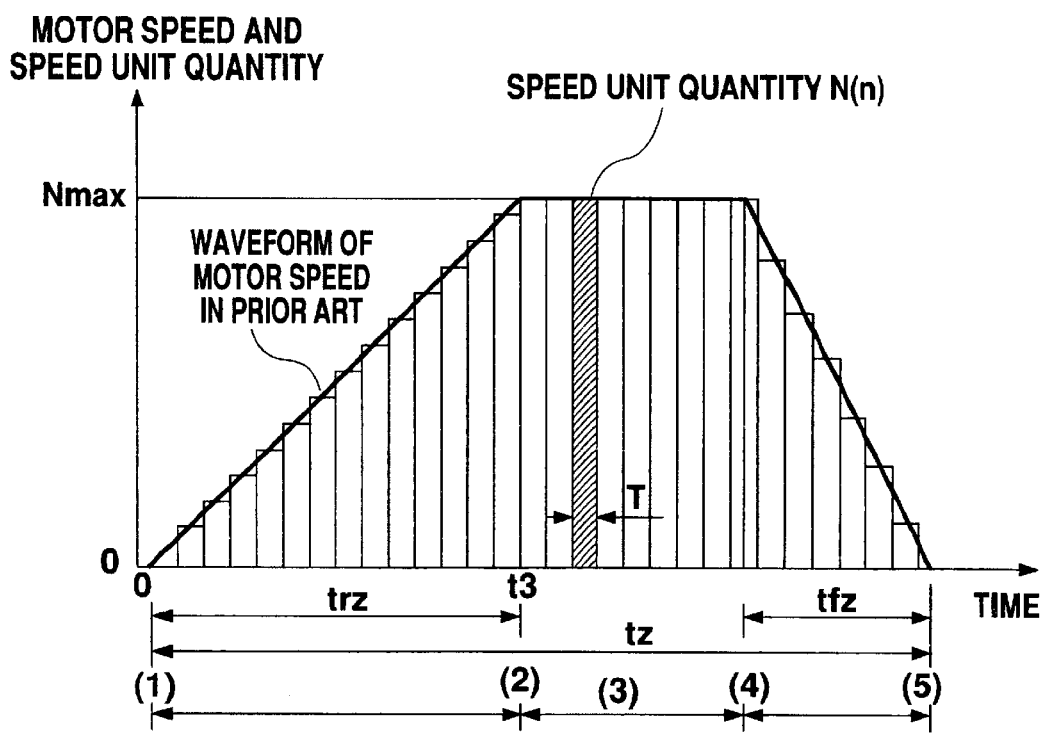
FIG. 7 is a figure showing waveforms of motor speed and motor torque according to an example of the prior arts.
Figure 7:
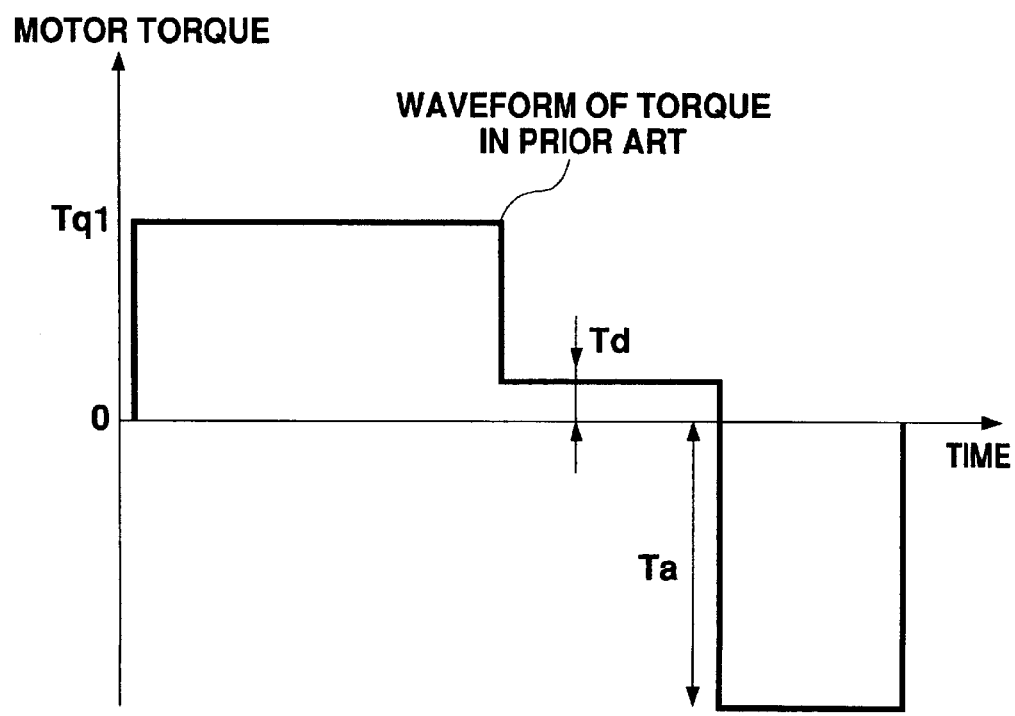

FIG. 2 is a part of a flow chart showing operation of the function generating section 15*b* shown in FIG. 1, and shows steps from S3 to S5 in the flow chart of the prior art shown in FIG. 6. Other steps are the same as those of the prior art.

When an accelerating mode has been discriminated at S3, the difference between the present speed unit quantity N (n) and the function change speed unit quantity Nc set as a parameter into the function change speed unit quantity 16 is calculated. Then, the polarity of the difference is discriminated (S10).

When the result calculated at S10 is smaller than zero (when the present speed unit quantity N (n) is smaller than the function change speed unit quantity Nc), a first position command N' (n+1) is calculated by adding the accelerating unit quantity ΔNaa, set as a parameter into the acceleration storage section 14, to the present speed unit quantity N (n) (S11).

When the result calculated at S10 is larger than or equal to zero, an exponential function acceleration unit quantity ΔNe (n) is calculated from the following mathematical expression as $$\Delta Ne(n)=(Nd-N(n))\cdot \Delta Naa/(Nd-Nc). \tag{Eq. 3}$$

The mathematical expression (Eq. 3) is such that ΔNe (n) is equal to ΔNaa when N (n)=Nc (S12).

Next, a second position command N' (n+1) is calculated by adding the exponential function acceleration unit quantity ΔNe (n) calculated at S11 to the present speed unit quantity N (n) (S13).

Next, the difference between the N' (n+1) calculated at S4b and the maximum speed unit quantity Nmax set as a parameter into the maximum speed storage section 13 is calculated. Then, the polarity of the difference is discriminated (S5).

Figure 3:
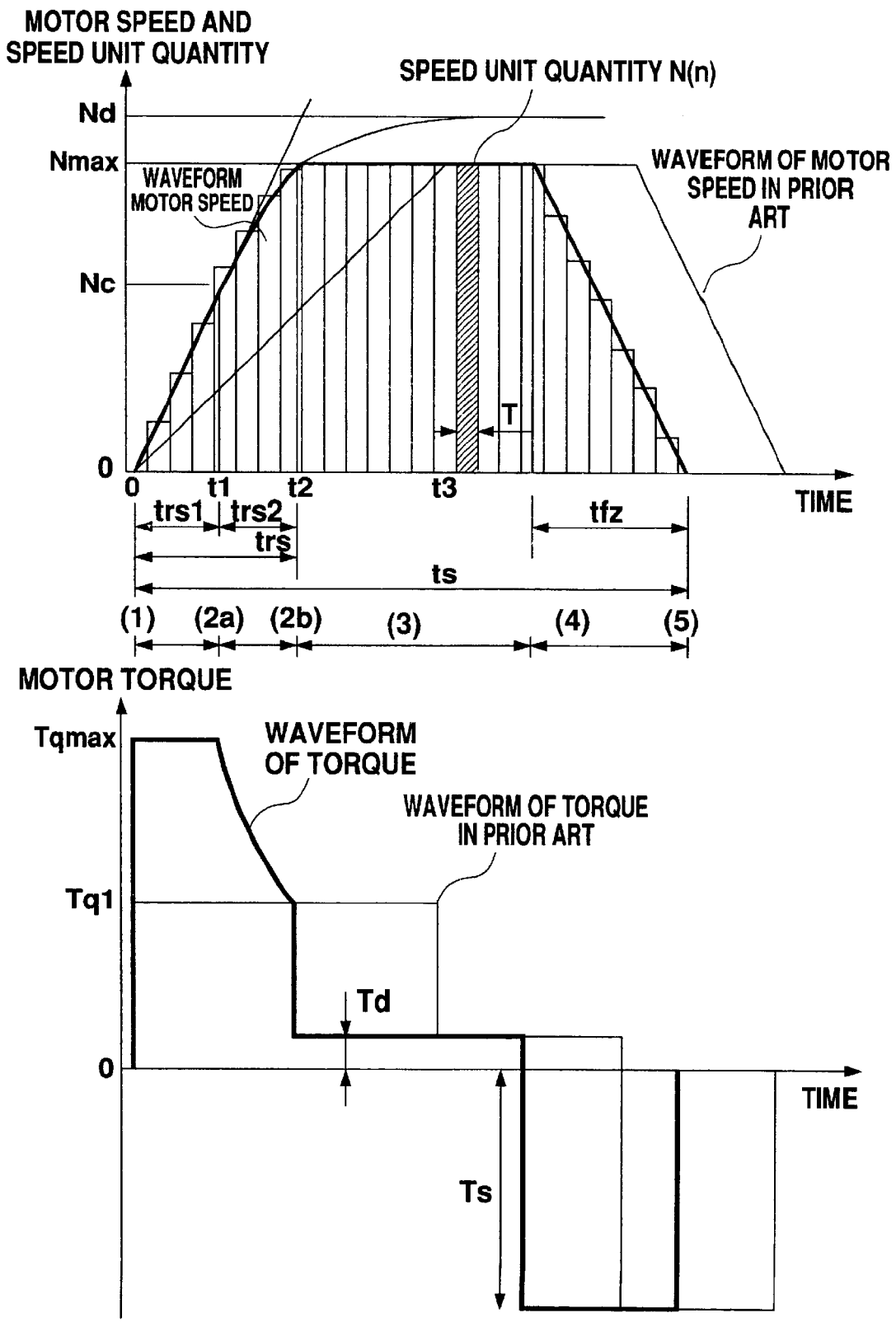
FIG. 3 is a figure showing waveforms of motor speed and motor torque according to an embodiment of the present invention.

The upper figure of FIG. 3 shows a change of the speed unit quantity N (n) and a waveform of a motor speed when a desired position has been given. The lower figure of FIG. 3 shows a waveform of motor torque. In the waveform of a motor speed, trs shows an accelerating period, tfz the same decelerating period as that in the prior art, and ts a positioning period necessary for arriving at a desired position. The speed unit quantity N (n) used as a positional command is generated in the function generating section 15b for every calculation period T.

A period from (1) to (2a) is a period for an accelerating mode when the speed unit quantity N (n) is smaller than a function change speed unit quantity Nc. In this case, a position command is generated by adding the accelerating unit quantity ΔNaa, set as a parameter into the acceleration storage section 14, to the present speed unit quantity N (n). Therefore, the waveform shows constant acceleration having a positive inclination. In FIG. 3, t1 shows such a time that the speed unit quantity N(n) is equal to Nc.

A period from (2a) to (2b) is a period for an accelerating mode when the speed unit quantity N(n) is larger than the function change speed unit quantity Nc. In this case, a position command is generated by adding the exponential function accelerating unit quantity Δ Ne(n) to the present speed unit quantity N(n). Therefore, the waveform shows exponential function acceleration. In FIG. 3, t2 shows such a time that the speed unit quantity N(n) is equal to Nmax at the end of the acceleration.

In FIG. 3, (3) shows a period for a constant speed mode. In this case, a position command is the maximum speed unit quantity Nmax.

A period from (4) to (5) is a period for a decelerating mode. In this case, a position command is generated by subtracting the decelerating unit quantity ΔNb, set as a parameter into the acceleration storage section 14, from the present speed unit quantity N(n). Therefore, the waveform shows constant acceleration having a negative inclination.

In FIG. 3, parts of the speed waveform corresponding to the accelerating periods are represented by the following mathematical expressions assuming that all variables are continuous quantities.

A position command in the period from (1) to (2a) is written as $$N(t)=(Nc/trs1)\cdot t, \tag{Eq. 4}$$

and the inclination of this function is given as $$dN(t)/dt=(Nc/trs1). \tag{Eq. 5}$$

The accelerating period trs1 is represented in terms of ωc, which is the function change speed unit quantity Nc reduced to angular velocity, and the maximum torque Tqmax in the range from 0 to Nc as $$trs1=J\cdot \omega c/(Tqmax-Td). \tag{Eq. 6}$$

A position command in the period from (2a) to (2b) is written as $$N(t)=Nc+(Nd-Nc)\cdot(1-\exp(-(t-t1)/\tau)), \tag{Eq. 7}$$

where τ is a time constant of the exponential function. The inclination of this function is given as $$dN(t)/dt=(Nd-Nc)\cdot(1/\tau)\cdot \exp(-(t-t1)/\tau). \tag{Eq. 8}$$

Because the inclinations of the functions of (Eq. 4) and (Eq. 7) are equal at the time t=t1, the time constant τ of the exponential function is given as $$\tau=trs1\cdot(Nd-Nc)/Nc. \tag{Eq. 9}$$

Because the speed unit quantity N(t2) at t=t2 is equal to Nmax, the following relationship is derived from (Eq. 7)

$$Nmax=Nc+(Nd-Nc)\cdot(1-\exp(-(t2-t1)/\tau)), \tag{Eq. 10}$$

and the accelerating period trs 2 is given as $$trs2 = t2 - t1 \tag{Eq. 11}$$
$$= -trs1\cdot((Nd-Nc)/Nc)\cdot$$
$$\ln((Nd-Nmax)/(Nd-Nc)).$$

The inclination of this function at t=t2 should be a maximum inclination which is decided by the maximum torque Tq1 at the motor speed of Nmax. In other words, the inclination at t2 is given as dN(t2)/dt=Nmax/trz, and the following expression is derived from (Eq. 8) as $$(Nd-Nc)\cdot(1/\tau)\cdot(1-\exp(-(t2-t1)/\tau))=Nmax/trz, \tag{Eq. 12}$$

and an asymptotic speed unit quantity Nd is written as $$Nd=Nmax\cdot(1-(trs1/trz))/(1-(Nmax/Nc)\cdot(trs1/trz)). \tag{Eq. 13}$$

Figure 4:
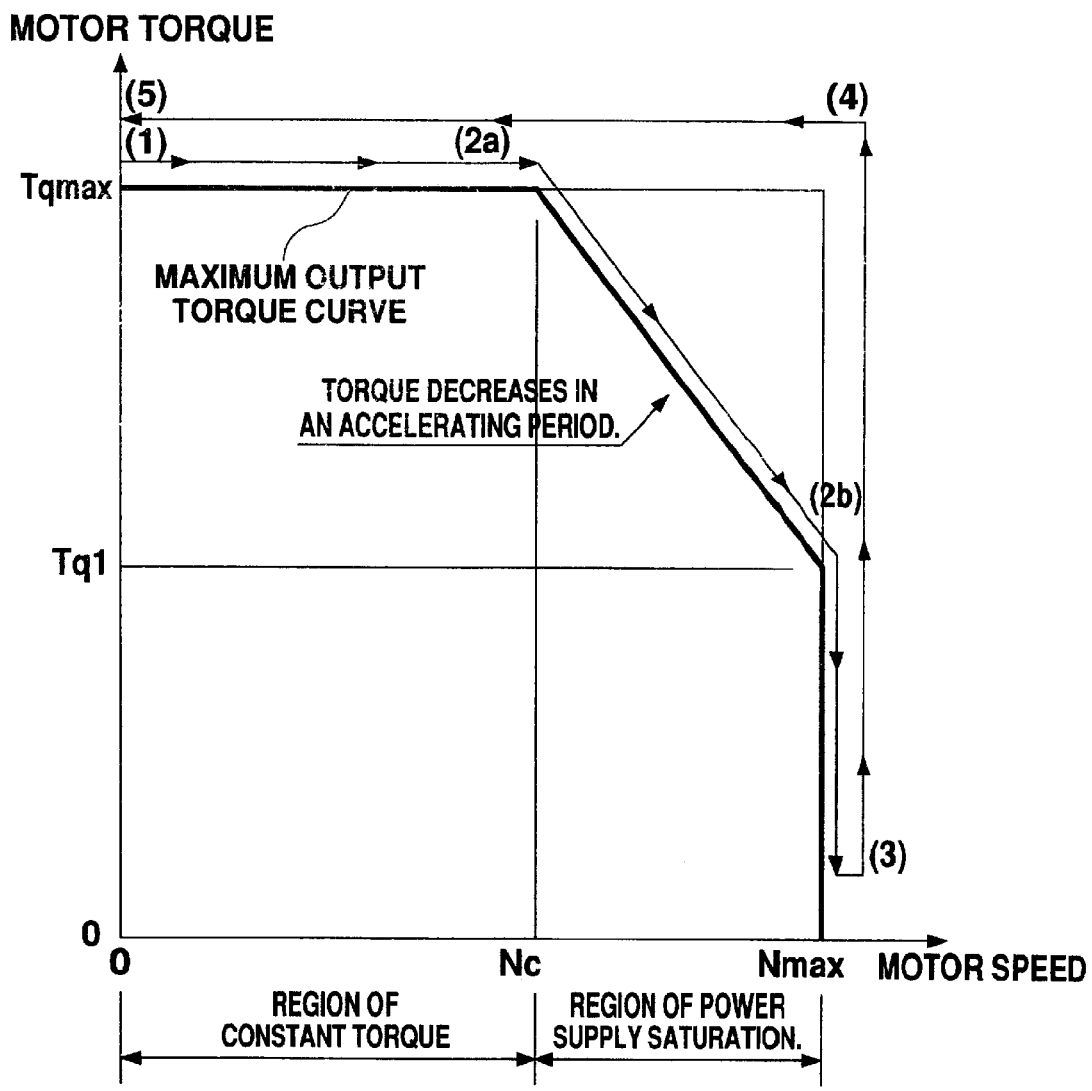
FIG. 4 is an output torque characteristic curve of a motor which gives such a torque diagram as shown in FIG. 3.
Figure 5:
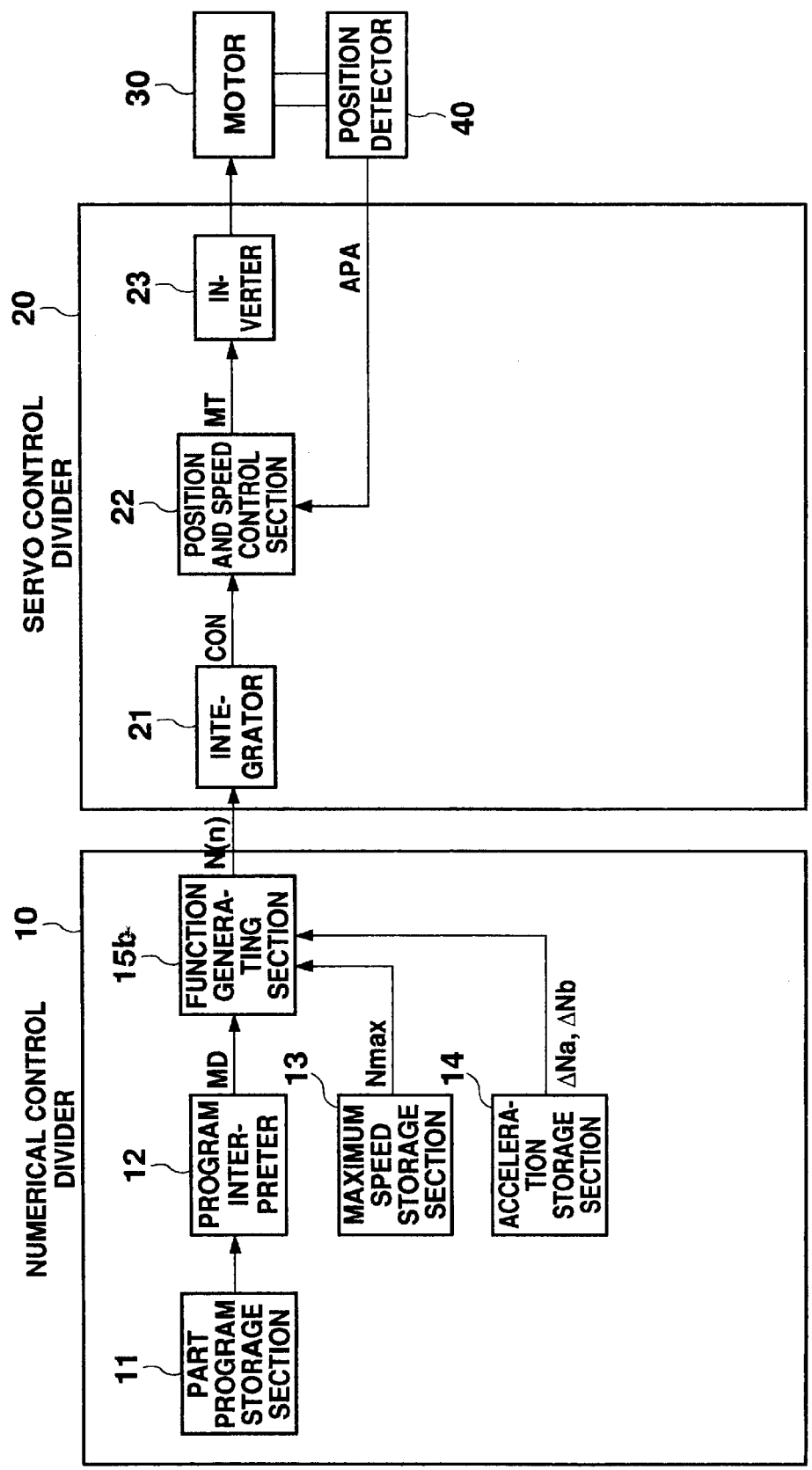
FIG. 5 is a block diagram of a position control apparatus according to an example of the prior arts.
Figure 8:
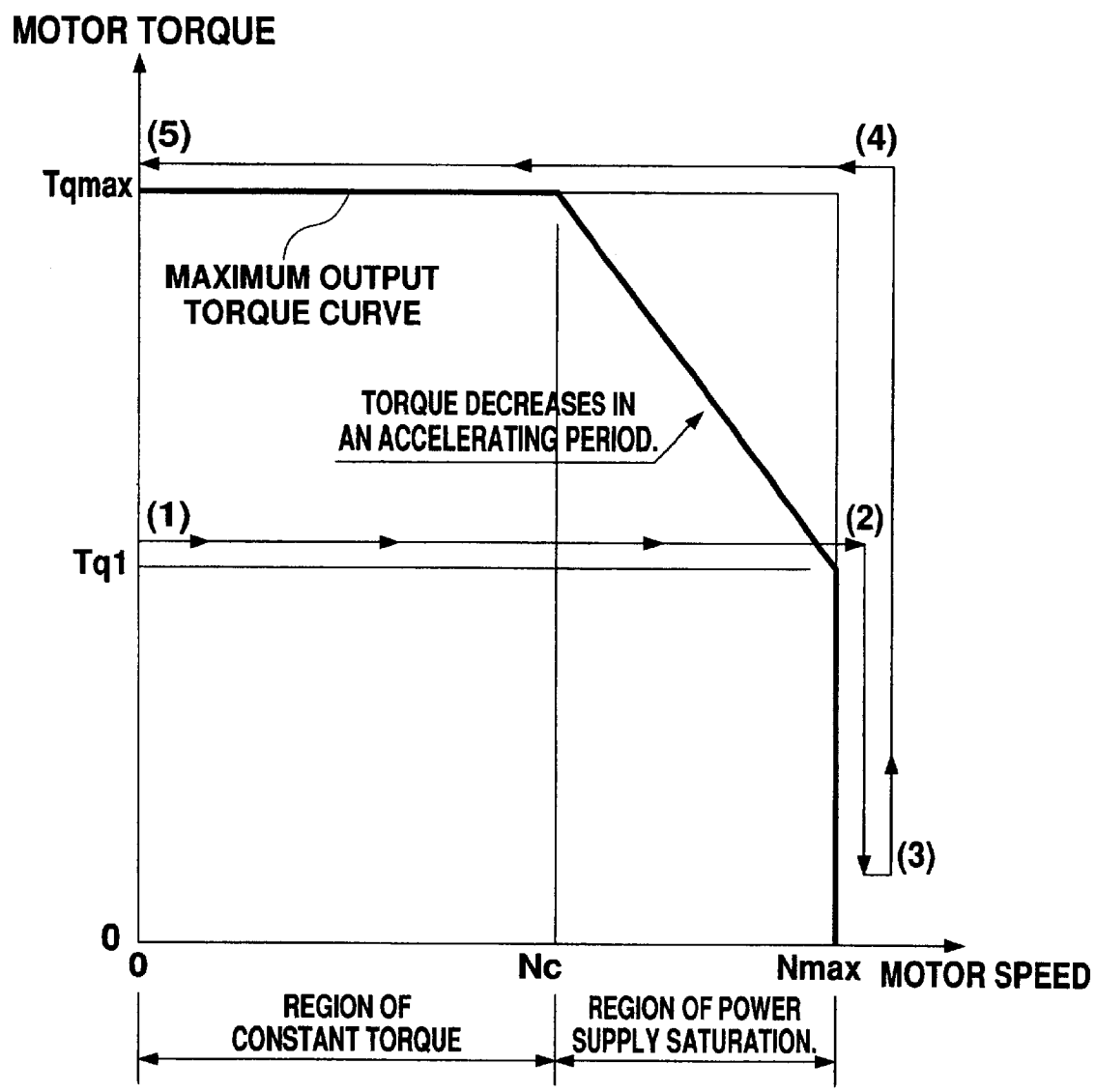
FIG. 8 is an output torque characteristic curve of a motor which gives such a torque diagram as shown in FIG. 7.

When the maximum output torque curves shown in FIG. 8 and FIG. 4 are such that Nc=0.6 Nmax, Tq1=0.1 Tqmax, and Td=0.1 Tqmax, the ratio of the accelerating period (trs/trz) is given as follows on the basis of the above expressions from (Eq. 1) to (Eq. 13).

$$trz=2.5\cdot(J\cdot \omega max/Tqmax) \tag{Eq. 14}$$

$$trs1 = 0.667 \cdot (J \cdot \omega max / Tq max) \quad \text{(Eq. 15)}$$

$$\omega d = 1.32 \cdot \omega max \quad \text{(Eq. 16)}$$

$$t2 - t1 = 0.649 \cdot (J \cdot \omega max / Tq max) \quad \text{(Eq. 17)}$$

$$\begin{aligned} trs/trz &= (trs1 + trs2)/trz \\ &= (t1 + (t2 - t1))/trz \\ &= (0.667 + 0.649)/2.5 \\ &= 0.526 \end{aligned} \quad \text{(Eq. 18)}$$

It is seen from (Eq. 18) that the accelerating period is reduced to about ½.

FIG. 4, as well as FIG. 8, is a motor output torque characteristic curve. When the waveforms of motor speed and motor torque shown in FIG. 3 are overwritten on the motor output torque characteristic curve of FIG. 4, the curve passes along the maximum output torque curve as shown by arrows (1), (2a), (2b), (3), (4), and (5).

As described above, according to the position control apparatus of the present invention, a position command can be generated so that a constant acceleration and an exponential function acceleration are obtained so as to generate the torque in accordance with the maximum output torque curve of a motor output torque characteristic curve. Therefore, an accelerating period can be shortened, and thus a positioning time can be reduced.

What is claimed is:

1. A position control apparatus using a servomotor in which a position control command is generated on the basis of a desired value data, speed unit quantity, and an acceleration unit quantity so that output torque of the servomotor is smaller than the maximum output torque of the servomotor, and the servomotor is driven by a torque command calculated on the basis of the position command, the position control apparatus comprising:

first position command generating means for generating a first position command so as to give constant acceleration by adding an acceleration unit quantity $\Delta Naa$, set as a parameter beforehand, to a speed unit quantity $N(n)$;

second position command generating means for generating a second position command by calculating an acceleration unit quantity using an exponential function expression and by adding the calculated result to the speed unit quantity $N(n)$; and actual position command generating means for generating an actual position command by comparing a present speed unit quantity $N(n)$ and a function change speed unit quantity $Nc$ set as a parameter beforehand and by selecting either of the first position command generating means or the second position command generating means on the basis of the compared result.

2. A position control apparatus according to claim 1, comprising:

means for deciding a time constant T of the exponential function expression so that a maximum value of the acceleration unit quantity of the exponential function expression is equal to the acceleration unit quantity $\Delta Naa$ for the constant acceleration.

* * * * *